United States Patent
Highgate

(10) Patent No.: US 9,142,851 B2
(45) Date of Patent: Sep. 22, 2015

(54) COMPOSITE MEMBRANES HAVING A HYDROPHILIC MATERIAL AND A CONDUCTIVE MATERIAL SUSCEPTIBLE TO DEHYDRATION AND THEIR USE IN ELECTROCHEMICAL CELLS

(75) Inventor: Donald James Highgate, Surrey (GB)

(73) Assignee: ITM POWER (RESEARCH) LTD., South Yorkshire (GB)

( * ) Notice: Subject to any disclaimer, the term of this patent is extended or adjusted under 35 U.S.C. 154(b) by 1070 days.

(21) Appl. No.: 12/304,208

(22) PCT Filed: Jun. 13, 2007

(86) PCT No.: PCT/GB2007/002202
§ 371 (c)(1),
(2), (4) Date: Mar. 10, 2009

(87) PCT Pub. No.: WO2007/144616
PCT Pub. Date: Dec. 21, 2007

(65) Prior Publication Data
US 2009/0286122 A1   Nov. 19, 2009

(30) Foreign Application Priority Data
Jun. 13, 2006 (GB) .................................. 0611600.8

(51) Int. Cl.
*H01M 8/10* (2006.01)
*C25B 13/04* (2006.01)

(52) U.S. Cl.
CPC ............. *H01M 8/1053* (2013.01); *C25B 13/04* (2013.01); *H01M 8/1023* (2013.01); *H01M 8/1039* (2013.01); *H01M 8/1088* (2013.01); *H01M 2300/0082* (2013.01); *H01M 2300/0091* (2013.01); *H01M 2300/0094* (2013.01); *Y02E 60/521* (2013.01)

(58) Field of Classification Search
None
See application file for complete search history.

(56) References Cited

U.S. PATENT DOCUMENTS

| | | | |
|---|---|---|---|
| 5,084,173 A * | 1/1992 | Nitadori et al. .......... 210/321.89 |
| 5,981,097 A * | 11/1999 | Rajendran ..................... 429/494 |
| 6,248,469 B1 * | 6/2001 | Formato et al. .................. 521/27 |
| 6,465,136 B1 | 10/2002 | Fenton et al. |
| 6,562,446 B1 * | 5/2003 | Totsuka ..................... 428/304.4 |
| 6,689,501 B2 | 2/2004 | Stone et al. |
| 6,765,027 B2 * | 7/2004 | Holdcroft et al. ............... 521/27 |
| 2002/0127474 A1 | 9/2002 | Fleischer et al. |
| 2003/0113603 A1 * | 6/2003 | Highgate ......................... 429/30 |
| 2004/0081876 A1 | 4/2004 | Fenton et al. |
| 2006/0014067 A1 * | 1/2006 | Hedhli et al. .................... 429/33 |
| 2006/0068257 A1 * | 3/2006 | Cheng et al. ..................... 429/33 |
| 2006/0241192 A1 * | 10/2006 | Kitamura et al. ................ 521/27 |
| 2008/0063920 A1 * | 3/2008 | Highgate et al. ................ 429/40 |

FOREIGN PATENT DOCUMENTS

| | | |
|---|---|---|
| WO | WO 00/66652 A1 | 11/2000 |
| WO | WO 03/023890 | 3/2003 |
| WO | WO 2005/124893 | 12/2005 |
| WO | WO 2006/032887 | 3/2006 |
| WO | WO 2006/131758 | 12/2006 |
| WO | WO 2007/105004 | 9/2007 |

* cited by examiner

*Primary Examiner* — Michael Jung
(74) *Attorney, Agent, or Firm* — Saliwanchik, Lloyd & Eisenschenk

(57) ABSTRACT

A composite membrane suitable for use in an electrochemical cell, comprises layers of a hydrophilic material and of a second material having relatively high conductivity and which is also relatively susceptible to dehydration.

8 Claims, No Drawings

COMPOSITE MEMBRANES HAVING A HYDROPHILIC MATERIAL AND A CONDUCTIVE MATERIAL SUSCEPTIBLE TO DEHYDRATION AND THEIR USE IN ELECTROCHEMICAL CELLS

CROSS-REFERENCE TO RELATED APPLICATIONS

This application is a National Stage Application of International Application Number PCT/GB2007/002202, filed Jun. 13, 2007; which claims priority to Great Britain Patent Application No. 0611600.8, filed Jun. 13, 2006, all of which are incorporated herein in their entirety.

FIELD OF INVENTION

This invention relates to an electrochemical cell and, in particular, to composite membranes of the type which may be used, inter alia, in a membrane electrode assembly (MEA) in an electrochemical cell.

BACKGROUND OF INVENTION

Many ionic polymer membranes used in electrochemical cells are an electrolyte comprising only one active material, having homogeneous properties throughout. The properties of the membrane will have an effect on the performance of the electrochemical cell, such as cross-over coefficient, conductivity, mechanical strength, softness, water content and hydration control. Optimisation of one property may lead to a reduction in performance, due to effects on other properties.

Nafion is a fluorinated polymer with side-chains containing strongly ionic groups. It is a thermoplastic material which shows high conductivity and low cross-over, but suffers from dehydration when used in a fuel cell unless gases and their associated hydration levels are carefully managed. In addition, contact between this material and a catalyst in a MEA requires hot-pressing, and this contact often suffers delamination when the MEA is re-hydrated in or before use.

WO2006/131758 describes graft copolymers that can be used as membrane materials. They are obtained by forming a polymer film, and reacting the film with a material having strongly ionic groups, to form a polymer film having the ionic groups grafted thereon.

WO03/023890 discloses hydrophilic materials including a strongly ionic group, suitable for use in electrochemical cells. They comprise a polymer, optionally cross-linked, obtainable by copolymerisation of hydrophilic and hydrophobic monomers, a monomer including a strongly ionic group, and water.

WO2005/124893 and PCT/GB2007/000949 describe composite membranes utilising hydrophilic cross-linked polymers of the type described in WO03/023890.

WO2006/032887 describes a method of performing an electrochemical reaction in an electrochemical cell comprising electrodes separated by a membrane capable of taking up an electrolyte. The method comprises introducing into the cell an oxidisable component and an electrolyte, and oxidising the fuel in the presence of an acid or alkali.

SUMMARY OF INVENTION

The present invention provides a means whereby the physical and chemical properties across a membrane of an MEA can be controlled. The invention provides a composite membrane comprising materials in which selected properties, e.g. water content and conductivity, may be controlled so as to be different throughout. The membrane may comprise a plurality of materials that are inherently cationic and/or anionic, thermoplastic and/or thermoset and optionally also hydrophilic.

According to the invention, a composite membrane comprises a plurality of single homogeneous membranes which, when sandwiched together, form a membrane of different properties. Advantages of such a composite membrane may include improved water management, reduced cross-over of fluids, improved mechanical properties, and the ability to optimise conditions for catalysis at the anode and the cathode.

DESCRIPTION OF THE INVENTION

A composite membrane of the invention typically comprises a least one membrane which is soft, has good conductivity and hydration control. This can be a hydrophilic material, e.g. of the type described in WO03/023890 (see above; the contents of this and all other specifications identified herein are incorporated by reference). Preferably, such a material is in contact with both electrodes of a MEA. In an embodiment, the hydrophilic material is obtained by copolymerization of hydrophilic and hydrophobic monomers, a monomer including an ionic group, and water, such that the hydrophilic polymer thus obtained comprises hydrophilic and hydrophobic monomers and the monomer including the ionic group.

Another material that is used in the invention is typically of Nafion or a graft material, e.g. as described in WO2006/131758. When used in conjunction with a hydrophilic membrane, e.g. as the middle layer of a tri-layer structure, its tendency to dry out is reduced or prevented, and hot-pressing to catalyst structures is avoided. In an embodiment, this other material is obtainable by grafting a polymer film with a material having ionic groups.

A composite membrane of the invention can be provided as a part of a MEA comprising electrodes, and catalyst if required. It can be used in a fuel cell or electrolyser. The fuel can be hydrogen and oxygen or a liquid fuel with a liquid oxidant; see WO2006/032887.

A composite membrane of the invention can be produced via two methods. A first method comprising pressing together separately constructed single membranes. A second method comprises polymerising materials in situ; this offers the ability to polymerise a catalyst and/or catalyst electrode structure into the surface of the outer membrane, as described in WO03/023890, to achieve good contract between membrane materials, and create interpenetrated composite membrane materials, e.g. with a liquid or gel polymer penetrating the surface of a pre-made membranes.

Grafted membranes may be produced by a two-step procedure, i.e. the grafting of an intermediate moiety onto a polymer film, followed by sulphonation of the graft to provide a hydrophilic ion-conductive group. Two techniques are commonly used to produce the grafted polymer: mutual grafting, where the monomer is present during the irradiation, and post-irradiation grafting, where the polymer is first irradiated to create radicals which are then subsequently reacted with a monomer.

For mutual grafting, parameters such as total dose, dose rate, and monomer concentration may be important in determining the properties of the resulting copolymer. In addition, for post-irradiation grafting reaction, a finite number of radicals will be produced in the polymer, determined by the radiation dose and dose rate, the irradiation temperature and atmosphere. In pre-irradiation grafted materials, peroxy radicals may be produced. On heating these decompose, producing radicals able to react with the monomer. Therefore, both the grafting temperature and time are important parameters.

The following Examples illustrate the invention. A hydrophilic material described in WO03/023890 was used. Graft polymers were produced using ethylene-tetrafluoroethylene film (ETFE), low density polyethylene film (LDPE), styrene and chlorosulphonic acid.

Example 1

Mutual Grafting

Pieces of polymer film (approx. 0.3 m×0.5 m) were cut, weighed and rolled in a 'Swiss-roll' configuration with a non-woven interlayer. The roll was placed in a glass vessel and the vessel filled with monomer solution. The solution was allowed to soak into the roll for approximately 10 minutes. The oxygen in the vessel was then either removed by purging with nitrogen or by evacuation using a water pump. The whole vessel was then placed in a Cobalt 60 gamma source to be irradiated for a predetermined time, the distance of the tube from the source determining the dose rate. The temperature of the irradiation cell was measured at 23±1° C. After irradiation, the vessel was emptied, the roll untied and the grafted films unwrapped from the interlayer. The copolymerised film was washed in toluene for 24 h, to remove unreacted or homopolymerised styrene, washed in methanol to remove the toluene, and dried to constant weight in an oven at 70° C.

No additional homopolymerisation inhibitor was used in any of the grafting experiments. The inhibitor present in the styrene (10-15 ppm 4-tert-butylcatechol) was shown to prevent excessive homopolymerisation.

The degree of grafting of the membranes was calculated using the following formula:

$$\frac{W_g - W_0}{W_g} \times 100 = \text{Degree of Grafting}(\%)$$

Where:
$W_0$=weight of polymer film before grafting
$W_g$=weight of grafted copolymer The degree of grafting therefore represents the grafted proportion of the copolymer and has an upper limit of 100%. Using this nomenclature, a copolymer with a graft weight of 50% comprises of 50% of the original polymer and 50% graft.

The dose rates used were between 500 and 50 Gy $h^{-1}$ to a total dose of 10 kGy. The total dose range was 10 to 30 kGy. The monomer concentration ranged from 20% to 70% (V/V) in toluene.

Sulphonation A standard sulphonation procedure was carried out on all the polymer films grafted and found to be suitable for all the copolymer types. The grafted polymers were immersed in a solution of chlorosulphonic acid in methylene chloride.

The concentration of the chlorosulphonic acid was 2%-5% (V/V) and the sulphonation time ranged from 1-5 h at ambient temperature. After sulphonation, the films were washed to neutrality with demineralised water.

Heat Treatment Procedure

Before being used, the membranes were subjected to a thermal annealing process, by being heated at 95° C. in demineralised water for 1 h and then dried in an oven at 40° C. The process has been found to increase the hydrophilicity and thus ionic conductivity of the grafted membranes.

Composite Membrane

A composite membrane was made by pressing together three single membranes which were manufactured independently. Each of the two layers of a cationic hydrophilic polymer allows good contact between the catalyst electrode structure and the outer edge of the membrane, and good hydration when in use, since the water can travel easily throughout the hydrophilic material. The grafted membrane reduces the cross-over of dissolved gases. The composite membrane is therefore one which offers good mechanical strength, the ability to achieve good pressed contact between membrane and catalyst without the need for hot-pressing, and low dissolved gas cross-over.

Example 2

Post-Irradiation Grafting

The polymer films were irradiated in air at 23±1° C. at a known dose rate and to set total doses. The films were then stored in a freezer at −18° C. until required.

The irradiated films were prepared for grafting by placing pieces of cut and weighed film (approx. 0.3 m×0.5 m) in a glass vessel and filling with monomer solution. As with the mutual grafting, no homopolymerisation inhibitor was used. The vessel was purged with nitrogen for 2 h, sealed and placed in a water bath at a set temperature for a known length of time. After grafting, the copolymers were retrieved, washed in toluene, dried to constant weight in the same manner as for the mutual grafts.

The polymer films were irradiated to total doses between 15 and 100 kGy. The monomer concentrations ranged from 20% to 80% (V/V). The grafting temperature ranged from 40 to 70±1° C. The grafting time ranged from 3 to 24 h.

Sulphonation

A standard sulphonation procedure was carried out on all the polymer films grafted and found to be suitable for all the copolymer types. The grafted polymers were immersed in a solution of chlorosulphonic acid in methylene chloride.

The concentration of the chlorosulphonic acid was 2%-5% (V/V) and the sulphonation time ranged from 1-5 h at ambient temperature. After sulphonation, the films were washed to neutrality with demineralised water.

Heat Treatment Procedure

Before being used, the membranes were subjected to a thermal annealing process, by being heated at 95° C. in demineralised water for 1 h and then dried in an oven at 40° C. The process has been found to increase the hydrophilicity and thus ionic conductivity of the grafted membranes.

Composite Membrane

A composite membrane was made by pressing together three single membranes which were manufactured independently. Each of the two layers of a cationic hydrophilic polymer allows good contact between the catalyst electrode structure and the outer edge of the membrane, and good hydration when in use, since the water can travel easily throughout the hydrophilic material. The grafted membrane reduces the cross-over of dissolved gases. The composite membrane is therefore one which offers good mechanical strength, the ability to achieve good pressed contact between membrane and catalyst without the need for hot-pressing, and low dissolved gas cross-over.

The invention claimed is:

1. A composite membrane suitable for use in an electrochemical cell, comprising layers of a hydrophilic material and a second material which is ionically conductive and susceptible to dehydration,
    wherein the hydrophilic material is ionically conductive,
    wherein the hydrophilic material is a hydrophilic polymer obtained by copolymerization of hydrophilic and hydrophobic monomers, a monomer including an ionic group, and water, such that the hydrophilic polymer thus obtained comprises hydrophilic and hydrophobic monomers and the monomer including the ionic group,
wherein the second material is inherently cationic or inherently anionic, and
wherein the second material is different from the hydrophilic material.

2. The membrane according to claim 1, wherein the second material is a fluorinated polymer with side-chains containing an ionically active site.

3. The membrane according to claim 1, wherein the second material is obtainable by grafting a polymer film with a material having ionic groups.

4. The membrane according to claim 1, which comprises outer layers of the hydrophilic material and an inner layer of the second material.

5. An electrode assembly (MEA) comprising catalyst-coated electrodes and, therebetween, a composite membrane suitable for use in an electrochemical cell,
wherein the composite membrane comprises layers of a hydrophilic material and a second material which is ionically conductive and susceptible to dehydration,
wherein the hydrophilic material is ionically conductive,
wherein the hydrophilic material is a hydrophilic polymer obtained by copolymerization of hydrophilic and hydrophobic monomers, a monomer including an ionic group, and water, such that the hydrophilic polymer thus obtained comprises hydrophilic and hydrophobic monomers and the monomer including the ionic group,
wherein the second material is inherently cationic or inherently anionic, and
wherein the second material is different from the hydrophilic material.

6. An electrochemical cell comprising an electrode assembly (MEA) comprising catalyst-coated electrodes and, therebetween, a composite membrane,
wherein the composite membrane comprises layers of a hydrophilic material and a second material which is ionically conductive and susceptible to dehydration,
wherein the hydrophilic material is ionically conductive,
wherein the hydrophilic material is a hydrophilic polymer obtained by copolymerization of hydrophilic and hydrophobic monomers, a monomer including an ionic group, and water, such that the hydrophilic polymer thus obtained comprises hydrophilic and hydrophobic monomers and the monomer including the ionic group,
wherein the second material is inherently cationic or inherently anionic, and
wherein the second material is different from the hydrophilic material.

7. A fuel cell comprising a composite membrane,
wherein the composite membrane comprises layers of a hydrophilic material and a second material which is ionically conductive and susceptible to dehydration,
wherein the hydrophilic material is ionically conductive,
wherein the hydrophilic material is a hydrophilic polymer obtained by copolymerization of hydrophilic and hydrophobic monomers, a monomer including an ionic group, and water, such that the hydrophilic polymer thus obtained comprises hydrophilic and hydrophobic monomers and the monomer including the ionic group,
wherein the second material is inherently cationic or inherently anionic, and
wherein the second material is different from the hydrophilic material.

8. An electrolyser comprising a composite membrane,
wherein the composite membrane comprises layers of a hydrophilic material and a second material which is ionically conductive and susceptible to dehydration,
wherein the hydrophilic material is ionically conductive,
wherein the hydrophilic material is a hydrophilic polymer obtained by copolymerization of hydrophilic and hydrophobic monomers, a monomer including an ionic group, and water, such that the hydrophilic polymer thus obtained comprises hydrophilic and hydrophobic monomers and the monomer including the ionic group,
wherein the second material is inherently cationic or inherently anionic, and
wherein the second material is different from the hydrophilic material.

* * * * *